US010209062B1

(12) United States Patent
Le Grand

(10) Patent No.: US 10,209,062 B1
(45) Date of Patent: Feb. 19, 2019

(54) USE OF OFFLINE ALGORITHM TO DETERMINE LOCATION FROM PREVIOUS SENSOR DATA WHEN LOCATION IS REQUESTED

(71) Applicant: Google LLC, Mountain View, CA (US)

(72) Inventor: Etienne Le Grand, Mountain View, CA (US)

(73) Assignee: Google LLC, Mountain View, CA (US)

( * ) Notice: Subject to any disclaimer, the term of this patent is extended or adjusted under 35 U.S.C. 154(b) by 700 days.

(21) Appl. No.: 14/815,460

(22) Filed: Jul. 31, 2015

Related U.S. Application Data

(60) Provisional application No. 62/032,272, filed on Aug. 1, 2014.

(51) Int. Cl.
*G01B 21/00* (2006.01)
*G01C 19/00* (2013.01)

(52) U.S. Cl.
CPC ............ *G01B 21/00* (2013.01); *G01C 19/00* (2013.01)

(58) Field of Classification Search
CPC ........... G06F 17/50; G06F 15/00; G06F 19/00
See application file for complete search history.

(56) References Cited

U.S. PATENT DOCUMENTS

| 6,947,734 | B1 | 9/2005 | Toubassi |
| 7,844,415 | B1 | 11/2010 | Bryant et al. |
| 8,509,761 | B2 | 8/2013 | Krinsky et al. |
| 8,521,429 | B2 | 8/2013 | Sundararajan et al. |
| 8,874,300 | B2 * | 10/2014 | Allard ............... H04L 67/12 700/245 |
| 9,357,520 | B2 | 5/2016 | Le Grand et al. |
| 2004/0127252 | A1 | 7/2004 | Tsunomoto |

(Continued)

FOREIGN PATENT DOCUMENTS

| WO | WO1995022041 | 8/1995 |
| WO | WO2012106075 | 8/2012 |

(Continued)

OTHER PUBLICATIONS

Jack Collier, no date, SLAM Techniques and Algorithms, Defense Research and Development Canada, pp. 1-73.*

(Continued)

*Primary Examiner* — Mischita Henson
(74) *Attorney, Agent, or Firm* — McDonnell Boehnen Hulbert & Berghoff LLP

(57) ABSTRACT

Examples describe systems and methods for iteratively determining a signal strength map for a wireless access point (AP) aligned to position coordinates. An example method includes receiving logs of data from devices. For a plurality of iterations, the method includes selecting a set of logs of data having an amount of GPS being less than a given amount of GPS in a previously selected set, determining estimates of signal strength maps for the wireless AP aligned to position coordinates based on the selected set and on given signal strength maps due to a previous iteration, and performing a simultaneous localization and mapping (SLAM) optimization of the possible locations of the wireless AP based on the given signal strength maps and the estimates of the signal strength maps. Based on the iterative optimizations, an output signal strength map is provided for the wireless AP aligned to position coordinates.

20 Claims, 6 Drawing Sheets

(56) References Cited

U.S. PATENT DOCUMENTS

| | | |
|---|---|---|
| 2006/0095349 A1 | 5/2006 | Morgan |
| 2008/0033645 A1 | 2/2008 | Levinson et al. |
| 2010/0042382 A1* | 2/2010 | Marsh .................. G06T 7/0006 703/1 |
| 2011/0028122 A1 | 2/2011 | Kota et al. |
| 2011/0250926 A1 | 10/2011 | Wiefeldt et al. |
| 2013/0138246 A1 | 5/2013 | Gutmann et al. |
| 2013/0225202 A1 | 8/2013 | Shim et al. |
| 2013/0257657 A1 | 10/2013 | Garin |
| 2013/0317944 A1 | 11/2013 | Huang et al. |
| 2014/0031980 A1 | 1/2014 | Gutmann et al. |
| 2014/0372072 A1 | 12/2014 | Guo et al. |
| 2015/0223189 A1 | 8/2015 | Le Grand et al. |
| 2015/0226577 A1 | 8/2015 | Le Grand et al. |
| 2015/0308839 A1 | 10/2015 | Jiang et al. |
| 2016/0025498 A1 | 1/2016 | Le Grand |
| 2016/0033265 A1 | 2/2016 | Le Grand et al. |

FOREIGN PATENT DOCUMENTS

| | | |
|---|---|---|
| WO | WO2013037034 | 3/2013 |
| WO | WO2013071190 | 5/2013 |

OTHER PUBLICATIONS

Kamarulzaman Kamarudin, 2014, Performance Analysis of the Microsoft Kinect Sensor for 2D Simultaneous Localization and Mapping (SLAM) Techniques, Sensors 14, 23365-23387; doi:10.3390/s141223365, pp. 23365-23387.*

Wolfram Burgard et al., no date, Introduction to Mobile Robotics SLAM: Simultaneous Localization and Mapping, pp. 1-48.*

Buonocore et al., Jul. 2012, A Sensor Data Fusion Algorithm for Indoor SLAM Using a Low-Cost Mobile Robot, Unknown Publisher, Conference Paper DOI: 10.1142/9789814415958_0097, pp. 762-769.*

Chen, et al., "Outlier-Detection-Based Indoor Localization System for Wireless Sensor Networks", Hindawi Publishing Corporation, International Journal of Navigation and Observation, http://www.hindawi.com/journals/ijno/2012/961785, 2012, vol. 2012, Article ID 961785, 11 pages.

Chen, et al., "Outlier-Detection-Based Indoor Localization System for Wireless Sensor Networks", http://www.hindawi.com/journals/ijno/2012/961785 (2012).

* cited by examiner

US 10,209,062 B1

USE OF OFFLINE ALGORITHM TO DETERMINE LOCATION FROM PREVIOUS SENSOR DATA WHEN LOCATION IS REQUESTED

CROSS REFERENCE TO RELATED PATENT APPLICATION

The present application claims priority to U.S. provisional patent application No. 62/032,272 filed on Aug. 1, 2014, the entire contents of which are herein incorporated by reference.

BACKGROUND

Unless otherwise indicated herein, the materials described in this section are not prior art to the claims in this application and are not admitted to be prior art by inclusion in this section.

In addition to having advanced computing and connectivity capabilities to facilitate high-speed data communication, many modern computing devices include a variety of sensors. For example, computing devices, such as smartphones, tablets, wearable computing devices, other types of mobile computing devices, and the like, are often equipped with sensors for imaging, positioning, and relative motion determination. A few examples of sensors that may be found in a computing device include accelerometers, gyroscopes, global positioning systems (GPSs), compasses, microphones, cameras, Wi-Fi sensors, magnetic sensors, and barometric pressure sensors, among other types of sensors.

Applications that are configured to operate on a computing device may take advantage of the variety of available sensors to perform various functions. As an example, many applications take advantage of positioning sensors available on a computing device to determine a location of the computing device. The location of the computing device can be determined, for example, using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. Based on the location of either the cellular base station or an 802.11 access point, the mobile computing device can calculate its position. Within some instances, a localization of a mobile computing device may occur via use of data from multiple different networks.

Generally, location-based services are accessible through a mobile computing device based on determining the location of the mobile computing device. A few of the most common mobile location-based services include mapping, navigation, and searching for nearby restaurants or stores. As another example, some mobile applications track health and fitness information using sensors of a mobile computing device. Other applications use sensors in mobile computing devices to facilitate monitoring environmental conditions. The applications described above are just a few of the many examples of applications that utilize sensors of a mobile device.

SUMMARY

In one example, a method is provided that comprises determining sensor data at a plurality of intervals over a time period. In this example, determining the sensor data includes using one or more sensors and a sensor processor of a mobile device while a main application processor of the mobile device is in an inactive state in relation to determining the sensor data. Generally, the sensor processor is configured to determine the sensor data using less power than the main application processor is configured to use to determine the sensor data. The method also includes storing the sensor data in memory of the mobile device as the sensor data is determined, and receiving, by the main application processor, a request to determine a geographic location of the mobile device. Further, the method includes, in response to receiving the request, performing, by the main application processor, a simultaneous localization and mapping (SLAM) algorithm optimization using the stored sensor data all at once to determine the geographic location of the mobile device.

In another example, a computer readable memory having stored therein instructions, that when executed by a computing device, cause the computing device to perform functions is provided. The functions comprise determining sensor data at a plurality of intervals over a time period. In this example, determining the sensor data includes using one or more sensors and a sensor processor while a main application processor is in an inactive state in relation to determining the sensor data. Generally, the sensor processor is configured to determine the sensor data using less power than the main application processor is configured to use to determine the sensor data. The functions also include storing the sensor data in memory as the sensor data is determined, and receiving, by the main application processor, a request to determine a geographic location associated with the stored sensor data. Further, the functions include, in response to receiving the request, performing, by the main application processor, a simultaneous localization and mapping (SLAM) algorithm optimization using the stored sensor data all at once to determine the geographic location associated with the stored sensor data.

In still another example, a system is provided that comprises one or more processors, and data storage configured to store instructions that, when executed by the one or more processors, cause the system to perform functions. The functions comprise determining sensor data at a plurality of intervals over a time period. In this example, determining the sensor data includes using one or more sensors and a sensor processor while a main application processor is in an inactive state in relation to determining the sensor data. Generally, the sensor processor is configured to determine the sensor data using less power than the main application processor is configured to use to determine the sensor data. The functions also include storing the sensor data in memory as the sensor data is determined, and receiving, by the main application processor, a request to determine a geographic location associated with the stored sensor data. Further, the functions include, in response to receiving the request, performing, by the main application processor, a simultaneous localization and mapping (SLAM) algorithm optimization using the stored sensor data all at once to determine the geographic location associated with the stored sensor data.

In yet another example, a system is provided that comprises a means for determining sensor data at a plurality of intervals over a time period while a main application processor is in an inactive state in relation to determining the sensor data. In this example, the means for determining sensor data is configured to determine the sensor data using less power than the main application processor is configured to use to determine the sensor data. The system also includes means for storing the sensor data in memory as the sensor data is determined, and means for receiving a request to determine a geographic location associated with the stored sensor data. Further, the system includes means for, in response to receiving the request, performing a simultaneous localization and mapping (SLAM) algorithm optimization using the stored sensor data all at once to determine the geographic location associated with the stored sensor data.

These as well as other aspects, advantages, and alternatives, will become apparent to those of ordinary skill in the art by reading the following detailed description, with reference where appropriate to the accompanying figures.

DETAILED DESCRIPTION

Figure 1:
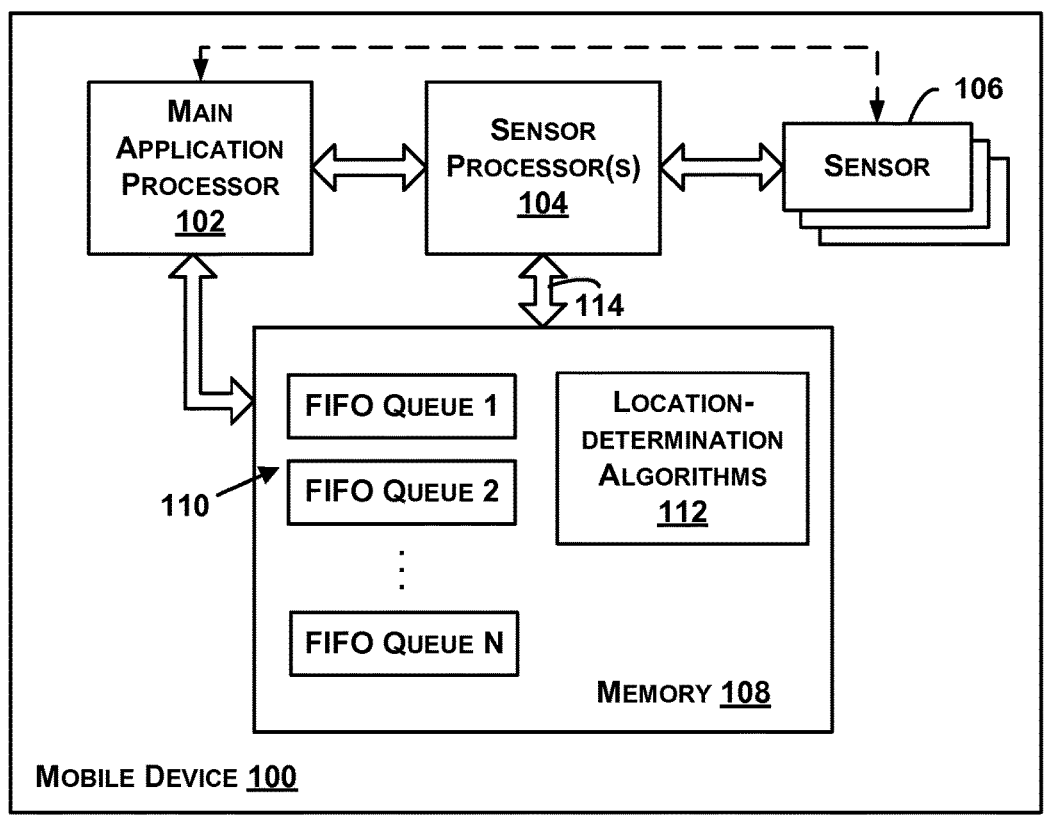
FIG. 1 illustrates an example mobile device.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. Overview

Using a main application processor of a computing device (e.g., a mobile computing device, such as a smartphone, tablet, or wearable computing device) for location computation can drain a device battery relatively quickly. This may especially be the case if the main application processor is used continuously or even periodically to compute and update the location. Further, common location computations using GPS signals, for example, may be inaccurate or even unavailable in some situations, such as indoors. Location computations may also take a relatively long time (e.g., 10 seconds or longer), which may result in a less than ideal user experience when the user (directly or indirectly) requests the device to determine the location. Illustratively, the user can directly request the location by opening a map application, and the user can indirectly request the location by entering a search query that may be based, at least in part, on a current location (such as may be the case when requesting a search for nearby restaurants, grocery stores, or another point of interest). Other examples of requests to determine the location are also possible.

In an example of the present disclosure, a main application processor performs a location computation using an algorithm that fuses a variety of different sensor data to more accurately and quickly determine the location. Such sensor data may relate to user step detection, device orientation detection, Wi-Fi scans, GPS signals, Bluetooth Low Energy (BLE) scans, magnetic field measurements, and/or barometer readings, for example. One such algorithm that the main application processor may use is GraphSLAM, which is a simultaneous localization and mapping (SLAM) algorithm.

Further, sensor circuitry can be used to collect and batch sensor data periodically over time and the batched sensor data can then be used in order to improve the accuracy and speed of the GraphSLAM algorithm to optimize a location determination. For instance, the sensor circuitry may include sensor chips (e.g., an integrated circuit, a microprocessor, or other signal processing components) and one or more sensors (e.g., an accelerometer, a gyroscope sensor, a global positioning system (GPS), a Wi-Fi sensor, a barometric pressure sensor, a magnetic sensor or other magnetometer, or other types of sensors). The sensor chips or processors may control different sensors to collect sensor data at different intervals over a time period, for instance, step events can be detected continuously, orientation can be detected at a frequency of about 5 Hz (about every 0.2 seconds), magnetic field measurements can be made at a frequency of about 5 Hz, barometer readings can be taken at a frequency of about 5 Hz, Wi-Fi signals can be scanned every 10 seconds (about 0.1 Hz), BLE signals can be scanned every 10 seconds, and GPS readings can be collected continuously or generally when available.

While the sensor circuitry acquires the sensor data, the main application processor may remain in a sleep state or inactive state in relation to acquiring or determining the sensor data. Although, it should be understood that the main application processor may be used for other processes while the sensor circuitry acquires the sensor data. Because the sensor circuitry typically consumes less power than the main application processor were to consume to determine sensor data, allowing the main application processor to remain in an inactive state in relation to acquiring sensor data may help conserve battery life of the device.

Generally, collecting sensor data in the background may provide applications of the device with access to a series of sensor data over a recent time period. Such sensor data may provide useful context information about a recent state of the device or behavior of a user of the device. For instance, analyzing stored location data, such as GPS logs, logs of nearby wireless access points, or pedestrian dead reckoning (PDR) data, may allow a location determination algorithm to quickly determine an estimate of the geographic location of the mobile device based on a path of the mobile device over a recent time period (e.g., the past thirty seconds, five minutes, etc.).

More particularly, in an aspect of the present disclosure, if an application on the device requests the location to be determined, the main application processor may then responsively request recently batched sensor data over a time period, and perform the GraphSLAM algorithm to determine the location by simultaneously using the batched sensor data all at once to optimize the computations (although perhaps through a plurality of iterations). Such an algorithm that uses different stored sensor data together all at once to optimize location computations is referred to generally herein as an offline algorithm. An online algorithm, such as a Kalman filter, does not require the use of stored sensor data, but operates generally continuously as new data is received to update a result of the algorithm. In other words, an online algorithm generally processes input (e.g., sensor data) piece-by-piece in a serial fashion in an order that the input is provided to the algorithm, and an offline algorithm generally is provided with an entire batch of inputs (e.g., stored sensor data over a time period) and processes the batch of inputs together at once (although perhaps through a plurality of iterations) to optimize a result.

In an example of the present disclosure, the main application processor can execute the offline GraphSLAM algorithm using the stored, historic sensor data in order to determine the location at different intervals over the time period. This historic location data can be used for a variety of applications, such as to assist a user to determine where they parked their car. The use of historic or batched sensor data over the time period may also be beneficial because a location determination algorithm generally is more accurate when processing changing data over time. When using a conventional online algorithm, however, this may not be the case if the algorithm were to process data from the time of the location request and onward, because users may have the tendency to request the location, and then to stop and wait for the determined location.

Accordingly, this disclosure relates to, inter alia, methods and systems for efficiently acquiring and batching sensor data using a mobile device, and then using the batched sensor data all at once in an offline algorithm to optimize a relatively immediate and accurate location determination. In addition to the above description, in some instances, sensor data may be acquired using a sensor processor and stored in one or more first-in, first-out (FIFO) queues. In some examples, if sensor data is not subsequently requested by the main application processor, the sensor processor may be configured to discount or replace stale sensor data. For instance, if the main application processor remains inactive and the sensor data is not requested within a certain amount of time, the sensor processor may overwrite the stored sensor data. In another instance, the sensor processor may discount or replace the stored sensor data when one or more of the FIFO queues are filled, such that additional sensor data may be acquired and stored.

Further, the computing device may present a map on a display, and show the device location on the map, or otherwise generate information and instructions for providing such a display. The location of the device may also be used in location-based services, such as to narrow an Internet search to an area that is nearby the client device location, to personalize "local" news and/or weather updates or information sent to the device, to direct emergency calls (e.g., 911 call-services) to an appropriate or closest call handling service, and the like.

II. Example Systems and Devices

Referring now to the figures, FIG. 1 illustrates an example mobile device 100. The mobile device 100 may represent any type of mobile computing device. By way of example, the mobile device 100 may be a mobile phone. However, the example is not meant to be limiting. In other instances, the mobile device 100 may be a laptop computer, tablet, wearable computing device, or other type of computing device.

As shown in FIG. 1, the mobile device 100 may include a main application processor 102, sensor circuitry, which is illustrated as including one or more sensor processors 104 and one or more sensors 106, and a memory 108. The main application processor 102 and the one or more sensor processors 104 may be any type of processor, such as a microprocessor, digital signal processor, multicore processor, and the like, coupled to the memory 108.

Additionally, the one or more sensor processors 104 may be configured to utilize the one or more sensors 106 to acquire and store sensor data using less power than the main application processor 102 consumes when utilizing the one or more sensors 106 to acquire and store sensor data. For instance, the one or more sensor processors 104 may be configured to transition from inactive or idle states to active states more quickly than the main application processor 102, allowing the one or more sensor processors 104 to consume less average power when periodically using the one or more sensors 106 to acquire sensor data.

In one example, any of the one or more sensor processors 104 may be a processor that is a component of a sensor. For instance, a given processor of the one or more sensor processors 104 may be a processor that is part of an accelerometer chip. Further, any of the one or more sensor processors 104 may be a dedicated sensor processor that is configured to acquire and store data using multiple sensors of the one or more sensors 106.

In one embodiment, the mobile device 100 may include a large system on a chip (SoC) having a main application processor as well as a more efficient, smaller, sensor processor. In another embodiment, the one or more sensor processors 104 may be a low-power core that is a component of the main application processor 102. For instance, the main application processor 102 may be a multi-core processor and a given core of the multi-core processor may be reserved for use as a sensor processor.

The one or more sensors 106 may include any of a variety of types of analog and/or digital sensors. For instance, the one or more sensors 106 may include one or any combination of a GPS, a Wi-Fi sensor, a gyroscope, a compass, an accelerometer, a barometer or other type of pressure sensor, an ambient light sensor, a microphone, a camera, and/or a magnetic sensor, among other types of sensors. In one example, the Wi-Fi sensor may be configured to scan for available wireless access points within a wireless range of the mobile device by broadcasting one or more probe requests.

The memory 108 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis. Although the memory 108 is shown as a single component, in other examples, the mobile device may include multiple memories (not shown). For example, the main application processor 102 may be coupled to a first memory and the one or more sensor processors 104 may be coupled to a second memory. In such an example, the main application processor 102 may retrieve data stored in the second memory by requesting the data from the one or more sensor processors 104.

The memory may include one or more FIFO queues 110 and one or more location-determination algorithms 112. Each of the one or more FIFO queues 110 may be implemented in the form of a set of read and write pointers, data storage, and control logic. For instance, the data storage may be SRAM, flip-flops, latches or any other suitable form of storage, and the control logic may specify how the one or more sensor processors 104, and optionally the main application processor 102, may read/write to the date storage.

In one example, the one or more sensor processors 104 may be configured to determine sensor data using the one or more sensors 106 on an interval basis. As an example, the one or more sensor processors 104 may acquire data using each of the one or more sensors 106 once per second, multiple times per second, once per minute, multiple times per minute, etc. However, in other examples, each of the one or more sensors 106 may be used to acquire data at different respective intervals. For instance, the one or more sensor processors 104 may be configured to acquire sensor data using a GPS once per minute, acquire sensor data using an accelerometer once every tenth of a second, and acquire sensor data using a Wi-Fi sensor once every two minutes. The one or more sensor processors 104 may also be configured to store the acquired sensor data into one or more FIFO queues as the sensor data is determined.

The one or more sensor processors 104 may be configured to determine the sensor data while the main application processor is inactive and the mobile device is in a sleep mode. For example, the one or more sensor processors 104 may be configured to acquire sensor data using the one or more sensors 104 without requiring that the main application processor be transitioned into an active state. In one instance, the one or more sensor processors 104 may be configured to acquire sensor data without having an application of the mobile device specifically requesting that sensor data be acquired.

In some examples, the one or more sensor processors 104 may also be configured to discount a portion of the sensor data that is stored in a given FIFO queue of the one or more FIFO queues 110 when the given FIFO queue is full, such that additional sensor data for a subsequent interval may be stored into the given FIFO queue. By way of example, if a sensor processor is configured to acquire sensor data using an accelerometer once every tenth of a second and to store the sensor data in a FIFO queue that can hold three thousand data elements, the FIFO queue may be full after storing five minutes of sensor data. To facilitate storing subsequently acquired sensor data, the sensor processor may be configured to erase or condense the stored sensor data, as is further described below with reference to FIGS. 3A-4B.

In one instance, the one or more sensor processors 104 may be configured to continuously acquire the sensor data and store the acquired sensor data into the one or more FIFO queues 110. In another instance, the one or more sensor processors 104 may be configured to acquire sensor data for a predetermined length of time in response to receiving a request from the main application processor 102. For example, the one or more sensor processors 104 may receive data from the main application processor 102 indicating a request to acquire and store sensor data for a period of five minutes. In still another instance, the one or more sensor processors 104 may be configured to acquire and store sensor data at regular scheduled times. For example, the one or more sensor processors 104 may be configured to acquire and store sensor data between the hours of 8 AM and 10 AM and between the hours of 4 PM and 6 PM every day, or between the hours of 8 AM and 8 PM every day.

In some instances, the one or more sensor processors 104 may also be configured to process data received from one or a combination of the one or more sensors 106, and store the processed sensor data in the one or more FIFO queues. For example, a given sensor processor may be configured to fuse sensor data from at least two of the one or more sensors 106 to determine an output, and store the determined output in a FIFO queue.

The main application processor 102 may also be configured to retrieve sensor data for a recent time period in some examples. For instance, the main application processor 102 may be configured to receive a request to determine a geographic location of the mobile device 100. In response to receiving the request to determine the location, main application processor 102 may be configured to retrieve the sensor data for the recent time period from the one or more FIFO queues. In one example, the main application processor 102 may retrieve all of the sensor date stored in the one or more FIFO queues.

As an example, the main application processor 102 may receive a request to determine a geographic location, and the processor may then responsively retrieve any available sensor data that is stored in memory (e.g., GPS and Wi-Fi sensor data for the past thirty seconds). The request may be received from an application of the mobile device 100 that estimates a geographic location of the mobile device 100, for instance. Upon receiving the request and retrieving the GPS and Wi-Fi sensor data from one or more FIFO queues, the main application processor 102 may then estimate a geographic location of the mobile device 100 using the retrieved sensor data.

In one example, the memory 108 may store one or more location-determination algorithms that the main application processor 102 may execute to estimate the geographic location of the mobile device 100. For instance, the main application processor 102 may use a location-determination algorithm to determine a location of the mobile device 100 based on the presence and/or location of one or more known wireless access points within a wireless range of the mobile device 100. In one example, the retrieved sensor data may include data indicating an identity of one or more wireless access points (e.g., a MAC address) and intensity of signals received (e.g. received signal strength indication) from each of the one or more wireless access points at various time instances over a period of time. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each wireless access point, a location estimate of the mobile device 100 may be determined for each time instance over the period of time.

In another example, the retrieved sensor data may include data indicating a fingerprint based on a pattern of signals received from one or more wireless access points. The main application processor 102 may execute a location-determination algorithm that involves comparing the fingerprint to one or more known calibration points for which a geographic location is known. Various deterministic algorithms, such as nearest neighbor in signal space (NNSS), k-nearest neighbor (KNN), and weighted k-nearest neighbor (WKNN), may be used to determine a closest calibration point to the fingerprint. Probabilistic methods may also be used to determine a most likely location based on a relationship between the fingerprint and known calibration points.

In another instance, the main application processor 102 may use a location-determination algorithm to determine a location of the mobile device 100 based on nearby cellular base stations. For example, the retrieved sensor data may identify the cell from which the mobile device 100 last received a signal from a cellular network at a given time. In an example in which the one or more sensors 106 include a cellular radio communication component, the cellular radio communication component may be configured to measure a round trip time (RTT) to a base station providing the signal. Thus, the retrieved sensor data may also include a RTT. In such an example, the main application processor 102 may be caused to combine this information with the identified cell to determine a location estimate.

As disclosed herein, the main application processor 102 may estimate a location of the mobile device 100 by optimizing a location-determination algorithm that uses a combination of sensor data from the one or more sensors 106 all at once to estimate the location. For example, the combination of sensor data may include data from a Wi-Fi sensor, GPS, cellular radio communication component, accelerometer, gyroscope, or magnetometer, and the processor 102 may use this and other data, such as dead reckoning data, to estimate the location of the mobile device 100. Such an optimization of the location-determination algorithm is generally known as an offline algorithm optimization.

Further, the main application processor 102 may also use the determined location to present a map on a display, and show a device location on the map, or otherwise generate information and instructions for providing such a display. The location of a device may also be used in location-based services, such as to narrow an Internet search to an area that is nearby the device location, to personalize "local" news and/or weather updates or information sent to the device, to direct emergency calls (e.g., 911 call-services) to an appropriate or closest call handling service, and the like.

As shown in FIG. 1, each of the main application processor 102, one or more sensor processors 104, one or more sensors 106, and memory 108 may be coupled together by one or more system buses, networks, or other connection mechanisms 114.

In some implementations, the mobile device 100 may include a device platform (not shown), which may be configured as a multi-layered Linux platform. The device platform may include different applications and an application framework, as well as various kernels, libraries, and runtime entities. In other examples, other formats or systems may operate the mobile device 100 as well.

Figure 2:
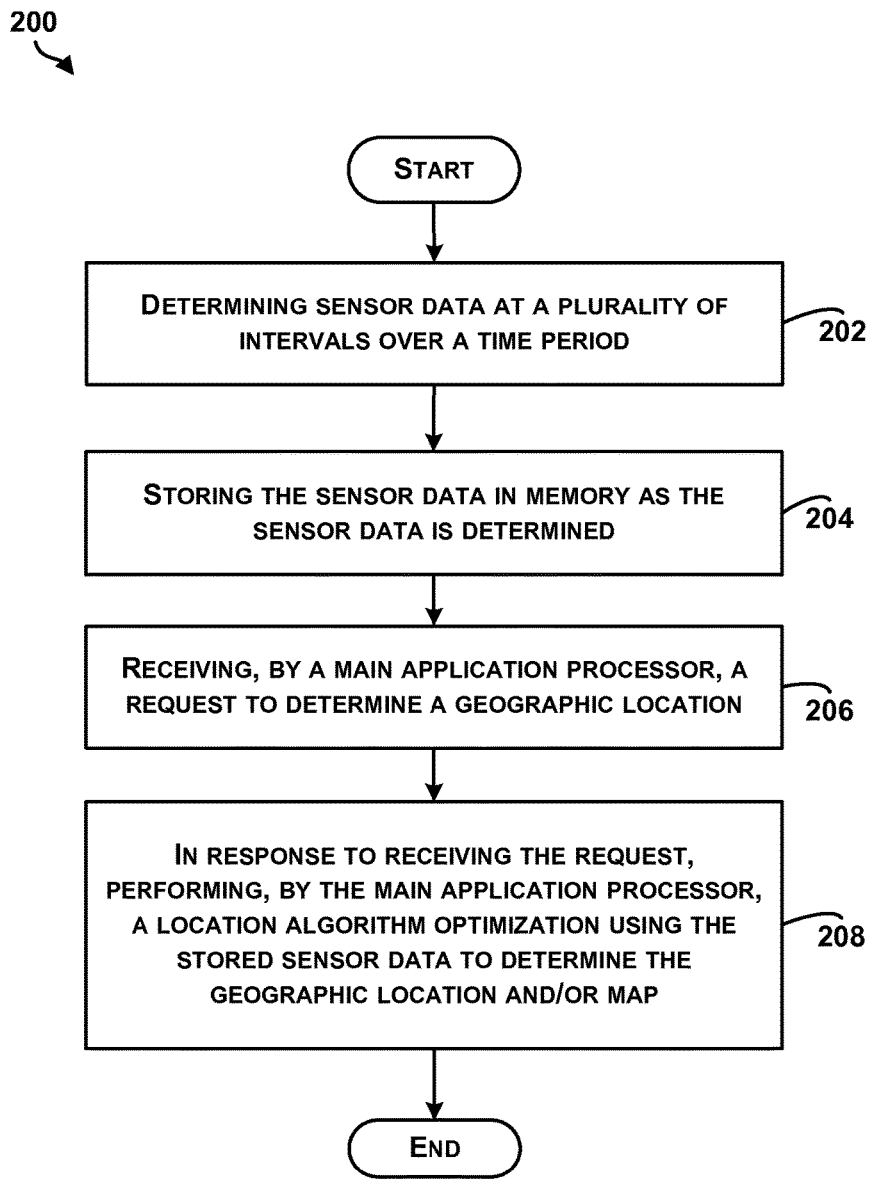
FIG. 2 is a block diagram of an example method in accordance with an embodiment of the present disclosure.

FIG. 2 is a block diagram of an example method 200 for batching sensor data over a time period and using the batched sensor data in an offline location-determination algorithm to estimate or determine a location associated with the sensor data. Method 200 shown in FIG. 2 presents an embodiment of a method that could be used or implemented by the mobile device 100 of FIG. 1, for example, or more generally by any computing device. Method 200 may include one or more operations, processes, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long-term storage, like read only memory (ROM), optical or magnetic disks, or compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 200 and other processes and methods disclosed herein, each block in FIG. 2 may represent circuitry that is wired to perform the specific logical functions in the process.

At block 202, the method includes determining sensor data using the one or more sensors at a plurality of intervals over a time period. In one example, the one or more sensors may include one or any combination of a GPS, a Wi-Fi sensor, a gyroscope, a compass, an accelerometer, a barometer or other type of pressure sensor, an ambient light sensor, a microphone, a camera, and/or a magnetic sensor, among other types of sensors. As discussed, above, the sensor processor may determine sensor data using the one or more sensors at a plurality of intervals. Each sensor may be used to collect sensor data at the same interval or at different intervals.

Generally, the determination or collection of sensor data can be performed over any time period, such as five minutes, an hour, a day, a week, continuously, etc. Further, the sensor processor may be configured to collect sensor data using less power than the main application processor would use if it were to determine sensor data. The sensor processor may also be configured to collect the sensor data using the one or more sensors while the main application processor is in an inactive state in relation to collecting the sensor data.

In some instances, determining the sensor data using the one or more sensors may involve combining sensor data received from at least two of the one or more sensors and/or otherwise processing sensor data received from one or more sensors. Therefore, in some examples, the determined sensor data may be processed sensor data rather than raw sensor data. The processing of the data may include fusing a variety of different sensor data to provide processed sensor data that can be used more accurately and quickly determine the location. Such processed sensor data may relate to user step detection, device orientation detection, Wi-Fi scans, GPS signals, Bluetooth Low Energy (BLE) scans, and/or magnetic field measurements, for example. The processing of the data may be performed by the sensor processor. Alternative or in combination, the processing of the data may be performed by the main application processor.

At block 204, the method includes storing the sensor data in memory, such as memory in a mobile device, as the sensor data is determined. At block 204, the sensor processor may store the determined sensor data into one or more FIFO queues of a memory. In one example, sensor data for each type of sensor used may be stored in a separate FIFO queue. In another example, sensor data determined using two or more sensors may be stored within the same FIFO queue. For example, a given FIFO queue may store both accelerometer data and gyroscope data.

At block 204, the method 200 may include determining, by the sensor processor, that a given one of the one or more FIFO queues is full. In one example, each of the one or more FIFO queues may be implemented as a circular queue having a read address register and a write address register. Initially, the read address register and the write address register for a given FIFO queue may each point to a first memory location. As elements are added to or removed from the circular queue, the positions of the read address register and write address register may advance around the circular queue. If the write address register progresses around the circular queue faster than the read address register to a point where the read address register and the write address register point to a common memory location again, the given FIFO queue is said to be full. Control logic associated with the FIFO may trigger an indication to the sensor processor that the given FIFO queue is full. Alternatively, the sensor processor may be configured to determine whether the given FIFO queue is full by reading an "isFull" Boolean parameter.

In one instance, sensor data may remain in the one or more FIFO queues until the sensor data is requested by the main application processor. If sensor data for a given FIFO queue is not requested by the main application processor, the given FIFO queue may fill up once the maximum number of elements for the given FIFO queue has been reached. At block 204, the method 200 may include in response to determining that a given one of the one or more FIFO queues is full, discounting, by the sensor processor, a portion of the sensor data that is stored in the given FIFO queue, such that additional sensor data for a subsequent interval may be stored in the given FIFO queue. In some examples, if sensor data stored in the given FIFO queue is not subsequently requested by the main application processor, the sensor processor may be configured to discount the stale sensor data. FIGS. 3A-4B are conceptual illustrations of discounting a portion of sensor data.

Figure 3A:
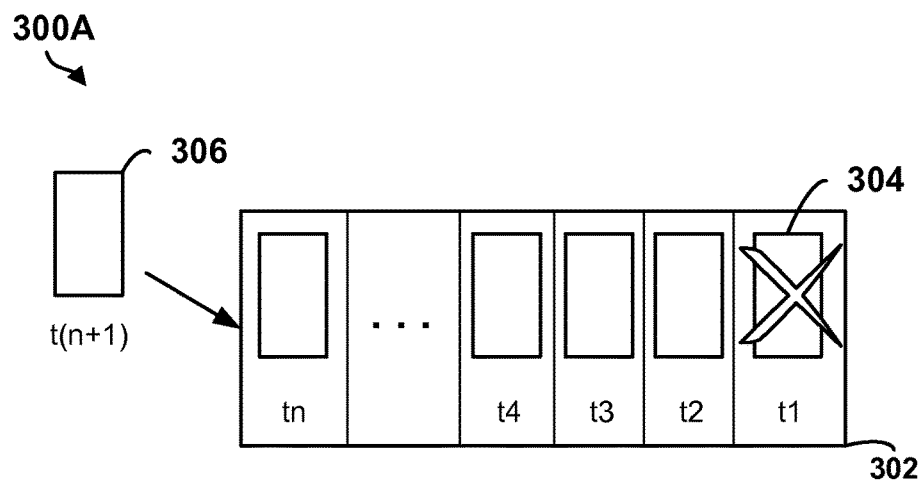
FIGS. 3A-3B are example conceptual illustrations of discounting a portion of sensor data.
Figure 3B:
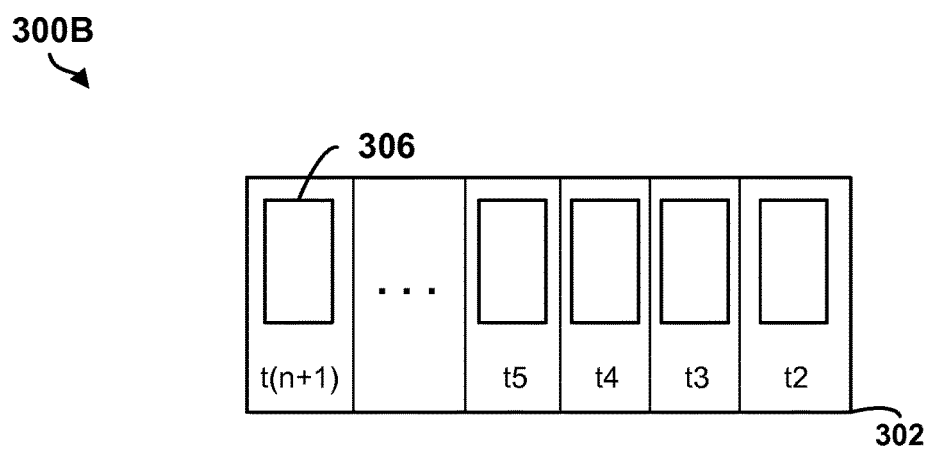

As shown in the conceptual illustration 300A of FIG. 3A, a number "n" of elements of sensor data may be stored in a FIFO queue 302. Each of the elements of sensor data may have been captured during a time period from time "t1" to "tn". Since the FIFO queue 302 is full, a sensor processor may be configured to discount data stored in the FIFO queue 302 by erasing or removing an element 304 stored at the front of the FIFO queue 302. Erasing the element 304 may allow an element 306 of sensor data that was determined at time "t(n+1)" to be stored in the queue 302. As shown in the conceptual illustration 300B of FIG. 3B, after the element 304 has been erased, the element 306 may be stored at the end of the FIFO queue 302. In other examples, multiple elements from the front of the FIFO queue may be erased simultaneously.

Figure 4A:
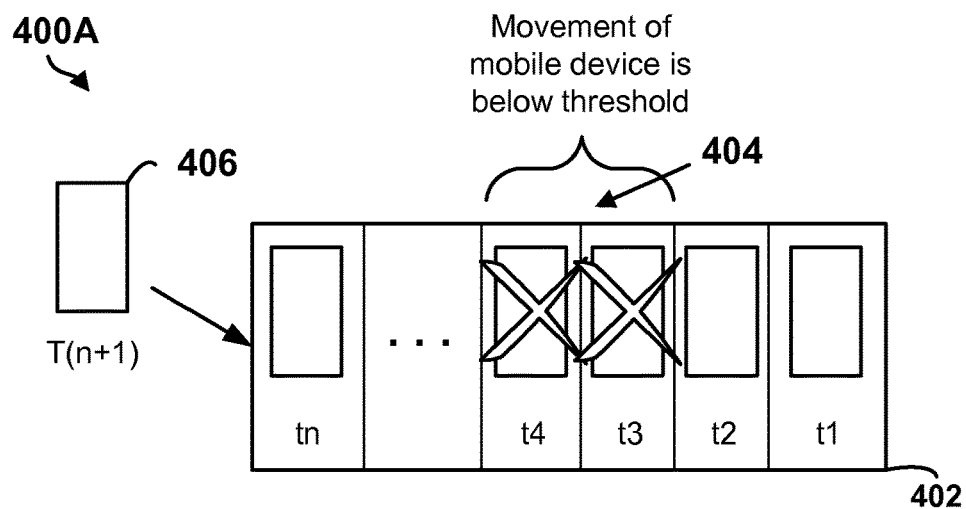
FIGS. 4A-4B are example conceptual illustrations of discounting a portion of sensor data.
Figure 4B:
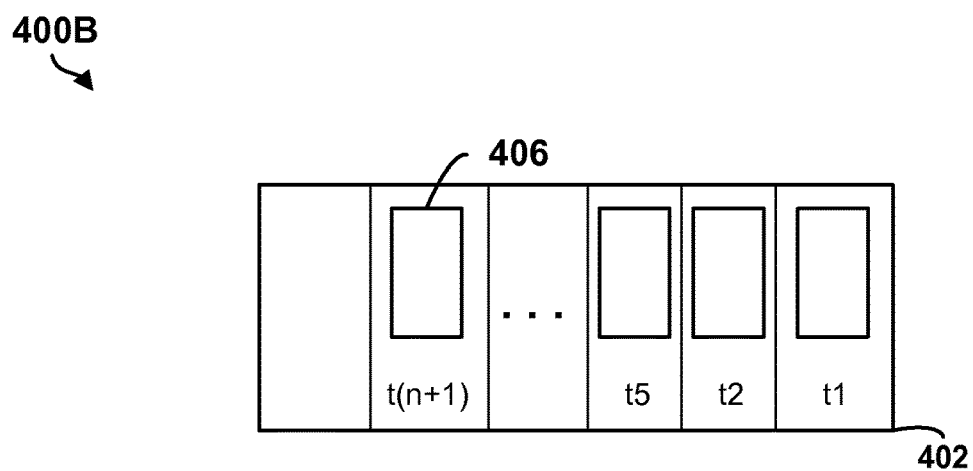

In some instances, elements of sensor data may be erased from other positions of a FIFO queue. For example, FIGS. 4A and 4B illustrate an example in which a portion of sensor data may be removed from positions other than the front of a FIFO queue. As shown in the conceptual illustration 400A of FIG. 4A, a number "n" of elements of sensor data may be stored in a FIFO queue 402. Each of the elements of sensor data may have been captured during a time period from "t1" to "tn". Since the FIFO queue 402 is full, a sensor processor may be configured to remove multiple elements 404 of sensor data from the FIFO queue 404.

In one instance, the sensor processor may determine that the elements 404 of sensor data are indicative that the mobile device is at rest for an elapsed period of time. For example, if the elements 404 include accelerometer readings that are below a threshold, the sensor processor may determine that the elements 404 indicate that the mobile device was at rest during the elapsed period of time. As another example, if the elements 404 include GPS readings, the sensor processor may determine that a difference between the GPS readings is below a threshold. In some instances, the sensor processor may determine that the elements 404 are associated with sensor data captured when the mobile device was at rest based on a time stamp associated with the elements 404. For example, if other sensor data stored in a separate FIFO queue includes GPS readings that are indicative that the mobile device is at rest during a given time period, the sensor processor may determine that the elements 404 of sensor data were also captured during the time period and, as a result, remove the elements 404.

As shown in conceptual illustration 400B of FIG. 4B, after the elements 404 have been removed from the FIFO queue 402, the element 406 may be stored at the end of the FIFO queue.

In another example, sensor data that is stored in a FIFO queue may be downsampled to free up space in the FIFO queue. For example, if a FIFO queue has a maximum capacity of one hundred elements and the FIFO queue is determined to be full, the sensor processor may remove every other element to downsample the sensor data. As a result, the FIFO queue may be able to store an additional fifty elements of sensor data. In other instances, the downsampling may be performed by averaging or otherwise combining portions of the stored sensor data. For example, a first and second element may be averaged and the first and second element may be replaced by the average, a third and fourth element may be averaged and the third and fourth element may be replaced by the average, and so forth.

Referring back to FIG. 2, at block 206, the method 200 includes receiving, by the main application processor, a request to determine a geographic location of the mobile device. Illustratively, the main application processor may receive the request in response to accessing one or more location-based services through the mobile device. For instance, a user may access one or more location-based services through the mobile device, such as a map application, an internet search application, some other web application, and the like. Other examples are also possible and contemplated herein.

At block 208, the method includes, in response to receiving the request, the main application processor performing a location algorithm optimization by using the stored sensor data together all at once to determine the geographic location and/or map associated with the mobile device. As discussed above, such an algorithm that uses different stored sensor data all at once to optimize location computations is referred to generally herein as an offline algorithm, whereas an online algorithm, such as a Kalman filter, does not require the use of stored sensor data, but operates generally continuously as new data is received to update a result of the algorithm.

At block 208, the main application processor may perform an offline simultaneous localization and mapping (SLAM) algorithm or a GraphSLAM algorithm optimization using stored, historic sensor data in order to determine the location and map at different intervals over the time period. Generally, each sensor data interval may be associated with a particular time within the time period, and using the associated times of each sensor data interval, the GraphSLAM algorithm can be optimized to track a historic position of the device over the time period. This historic position or location data can be used for a variety of applications, such as to assist a user to determine where they parked their car, for example.

Generally, when performing the GraphSLAM algorithm optimization, the batched sensor data indicates various parameters of where the device (and perhaps a user) moved during a time period. In one example of GraphSLAM, a trajectory of the device and a map of an environment of the device are simultaneously estimated using an iterative approach with a non-linear least squares fit so as to link different sensor data (e.g., sensor data collected at different times and/or sensor data collected by different sensors) and to determine a state of maximum likelihood. The state of maximum likelihood corresponds to the estimated location of the device and an estimated map of the environment. The main application processor uses the estimated location and the estimated map to determine an absolute location of the device (and perhaps a user of the device). At block 208, the main application processor may also perform the offline GraphSLAM algorithm optimization using a prior determined location and/or a prior determined map, which may have been stored along with the historic sensor data at block 206.

In another example, at block 208, the main application processor may retrieve or access a prior determined map from a database on the device and/or on a connected network. If the main application processor retrieves all of the needed map information from the database, the processor may perform the optimization at block 208 to determine a location of the mobile device, rather than to determine a simultaneous location and map. If the main application processor retrieves less than all of the needed map information from the database, the processor may perform a partial SLAM optimization at block 208 to determine a location of the mobile device and the remaining map information.

At block 208 (or after block 208), the main application processor may use the determined locations to present a map on a display, and show a device location on the map, or may otherwise generate information and instructions for providing such a display. The location of a device may also be used in location-based services or computer applications, such as to narrow an Internet search to an area that is nearby the device location, to personalize "local" news and/or weather updates or information sent to the client device, to direct emergency calls (e.g., 911 call-services) to an appropriate or closest call handling service, to direct emergency services to help locate the client device in case of emergency, and the like.

Figure 5:
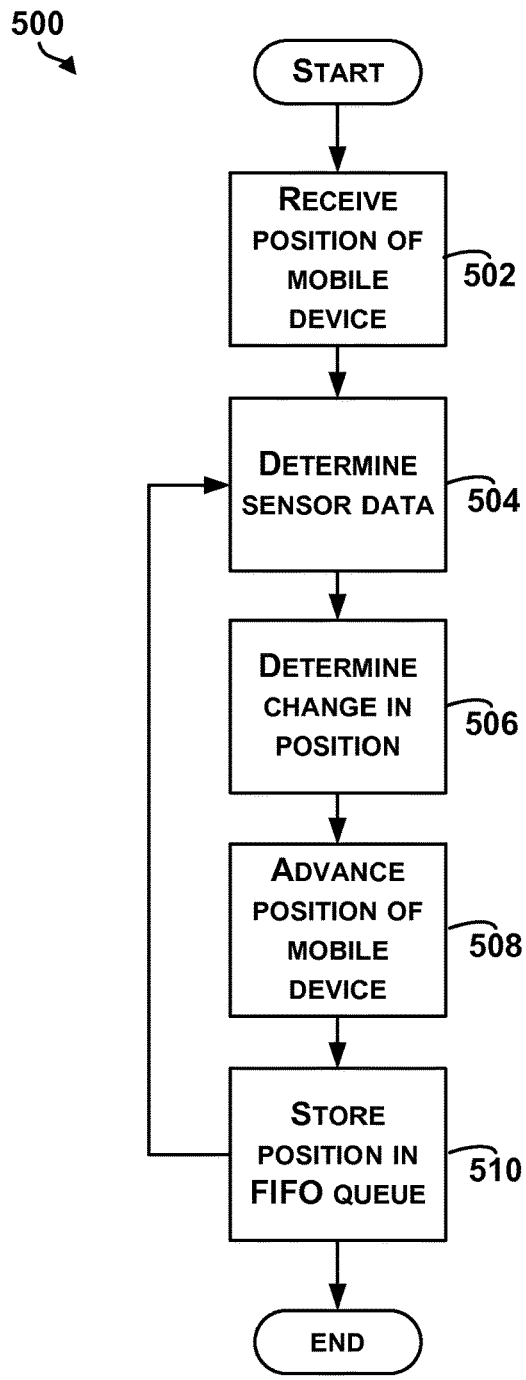
FIG. 5 is a flow chart of an example method of generating processed sensor data.

As described generally above, in some examples a sensor processor may be configured to process sensor data and store the processed sensor data in a FIFO queue. FIG. 5 is a flow chart of an example method 500 of generating processed sensor data. Method 500 shown in FIG. 5 presents an embodiment of a method that could be used or implemented by the mobile device 100 of FIG. 1, for example, or more generally by any computing device. Method 500 may include one or more operations, processes, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long-term storage, like read only memory (ROM), optical or magnetic disks, or compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 500 and other processes and methods disclosed herein, each block in FIG. 5 may represent circuitry that is wired to perform the specific logical functions in the process. In one example, the method 500 is performed by a sensor processor, as described hereinabove.

As shown in FIG. 5, at block 502, the method 500 may include receiving a position of a mobile device. For example, a sensor processor of the mobile device may receive a geographic estimate of the location of the mobile device from a main application processor of the mobile device.

At block 504, the sensor processor may determine sensor data using one or more sensors of the mobile device. For purposes of illustration, consider an example in which the sensor processor determines sensor data using an accelerometer and a gyroscope once every tenth of a second. At block 506, the sensor processor may fuse the sensor data determined using the accelerometer and the gyroscope to determine a change in position of the mobile device. In one instance, combining the sensor data may involve determining a number of steps that a user of the mobile device has taken based on accelerometer readings for a period of two seconds. Additionally, an average orientation of the mobile device over the same two-second period may be determined based on sensor data from the gyroscope. Based on the number of steps and average orientation during the number of steps, a change in position may be determined.

At block 508, the sensor processor may update the position of the mobile device by advancing the position of the mobile device based on the calculated change in position of the mobile device. For example, if at block 506 it is determined that the mobile device has been moved two steps north, the sensor processor may calculate a position that is two meters north of the position received at block 502. The calculated position may then be stored in a FIFO queue at block 510.

Optionally, the method 500 may proceed by looping back through blocks 504 to 510 to calculate a new position of the mobile device. During the subsequent iterations, at block 508, the position of the mobile device may be advanced based on the most recent position of the mobile device that was stored in the FIFO queue (as opposed to the initial position received at block 502 during the first iteration).

The example method 500 provides one example of a type of sensor fusion that may be performed, but the example method 500 is not meant to be limiting. Other types of sensor fusion are also contemplated. The fused sensor data or processed sensor data can then be stored and used at the block 208 of method 200 to determine a geographic location in response to a request at block 206.

Figure 6:
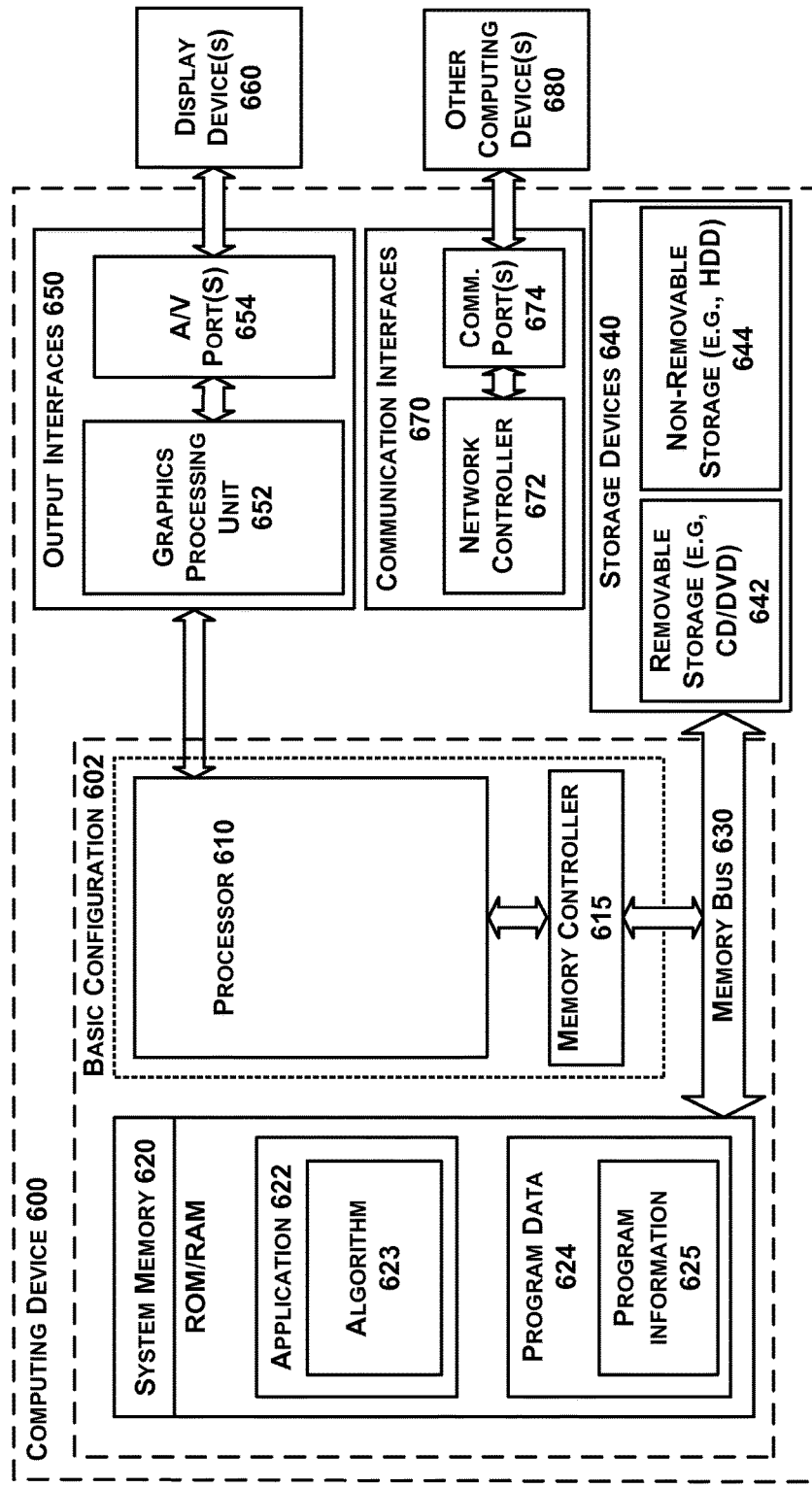
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device 600 may be implemented to determine sensor data using one or more sensor processors or perform any of the processes and algorithms disclosed herein. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (µP), a microcontroller (µC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include an algorithm 623 that is arranged to batch sensor data and process the batched sensor data using an offline location-determination algorithm, in accordance with the present disclosure. Program data 624 may include program information 625 that could be directed to any number of types of data. For instance, application 622 may execute an algorithm that is configured to determine sensor data using one or more sensors and store the sensor data into one or more FIFO queues. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include output interfaces 650 that may include a graphics-processing unit 652, which can be configured to communicate to various external devices such as display devices 660 or speakers via one or more A/V ports 654 or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer, including both laptop computer and non-laptop computer configurations, or a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described examples, it is intended that all matters in the preceding description and shown in the accompanying figures be interpreted as illustrative and not in a limiting sense. Further, it is intended to be understood that the following further describe aspects of the present description.

What is claimed is:

1. A method comprising:
   determining sensor data at a plurality of intervals over a time period, wherein determining the sensor data includes using one or more sensors and a sensor processor of a mobile device while a main application processor of the mobile device is in an inactive state in relation to determining the sensor data, wherein the sensor processor is configured to determine the sensor data using less power than the main application processor is configured to use to determine the sensor data;
   storing the sensor data in memory of the mobile device as the sensor data is determined;
   receiving, by the main application processor, a request to determine a geographic location of the mobile device; and
   in response to receiving the request, performing, by the main application processor, a simultaneous localization and mapping (SLAM) algorithm optimization using the stored sensor data to determine the geographic location of the mobile device.

2. The method of claim 1, further comprising the main application processor performing the SLAM algorithm optimization to determine a plurality of geographic locations of the mobile device over the time period that the sensor data was determined.

3. The method of claim 1, wherein storing the sensor data includes storing the sensor data in one or more first-in, first-out (FIFO) queues in the memory of the mobile device.

4. The method of claim 3, further comprising:
determining that one or more elements of the stored sensor data are indicative that the mobile device has remained stationary for an elapsed period of time; and
overwriting the determined one or more elements from the one or more FIFO queues.

5. The method of claim 1, wherein the one or more sensors comprise two or more sensors selected from the group consisting of a global positioning system (GPS) sensor, a Wi-Fi sensor, a gyroscope, an accelerometer, a magnetic sensor, and a pressure sensor.

6. The method of claim 1, wherein the stored sensor data includes a plurality of different sensor data received by a plurality of different sensors.

7. The method of claim 1, wherein the request is received by the main application processor in response to accessing one or more location-based services through the mobile device, wherein the location-based services include one or more of a map application or an internet search application.

8. A non-transitory computer readable medium having stored therein instructions, that when executed by one or more processors, cause the one or more processors to perform functions comprising:
determining sensor data at a plurality of intervals over a time period, wherein determining the sensor data includes using one or more sensors and a sensor processor while a main application processor is in an inactive state in relation to determining the sensor data, wherein the sensor processor is configured to determine the sensor data using less power than the main application processor is configured to use to determine the sensor data;
storing the sensor data in memory as the sensor data is determined;
receiving, by the main application processor, a request to determine a geographic location associated with the stored sensor data; and
in response to receiving the request, performing, by the main application processor, a simultaneous localization and mapping (SLAM) algorithm optimization using the stored sensor data to determine the geographic location associated with the stored sensor data.

9. The non-transitory computer readable medium of claim 8, wherein the functions further comprise performing the SLAM algorithm optimization to determine a plurality of geographic locations associated with the stored sensor data over the time period that the sensor data was determined.

10. The non-transitory computer readable medium of claim 8, wherein storing the sensor data includes storing the sensor data in one or more first-in, first-out (FIFO) queues in the memory.

11. The non-transitory computer readable medium of claim 10, wherein the functions further comprise determining that one or more elements of the stored sensor data are indicative that a mobile device has remained stationary for an elapsed period of time, and overwriting the determined one or more elements from the one or more FIFO queues.

12. The non-transitory computer readable medium of claim 8, wherein the one or more sensors comprise two or more sensors selected from the group consisting of a global positioning system (GPS) sensor, a Wi-Fi sensor, a gyroscope, an accelerometer, a magnetic sensor, and a pressure sensor.

13. The non-transitory computer readable medium of claim 8, wherein the stored sensor data includes a plurality of different sensor data received by a plurality of different sensors.

14. The non-transitory computer readable medium of claim 8, wherein the request is received by the main application processor in response to accessing one or more location-based services through a mobile device, wherein the location-based services include one or more of a map application or an internet search application.

15. A system comprising:
one or more processors; and
data storage configured to store instructions that, when executed by the one or more processors, cause the system to perform functions comprising:
determining sensor data at a plurality of intervals over a time period, wherein determining the sensor data includes using one or more sensors and a sensor processor while a main application processor is in an inactive state in relation to determining the sensor data, wherein the sensor processor is configured to determine the sensor data using less power than the main application processor is configured to use to determine the sensor data;
storing the sensor data in the data storage as the sensor data is determined;
receiving, by the main application processor, a request to determine a geographic location associated with the stored sensor data; and
in response to receiving the request, performing, by the main application processor, a simultaneous localization and mapping (SLAM) algorithm optimization using the stored sensor data to determine the geographic location associated with the stored sensor data.

16. The system of claim 15, wherein the functions further comprise performing the SLAM algorithm optimization to determine a plurality of geographic locations associated with the stored sensor data over the time period that the sensor data was determined.

17. The system of claim 15, wherein storing the sensor data includes storing the sensor data in one or more first-in, first-out (FIFO) queues in the data storage.

18. The system of claim 17, wherein the functions further comprise determining that one or more elements of the stored sensor data are indicative that a mobile device has remained stationary for an elapsed period of time, and overwriting the determined one or more elements from the one or more FIFO queues.

19. The system of claim 15, wherein the one or more sensors comprise two or more sensors selected from the group consisting of a global positioning system (GPS) sensor, a Wi-Fi sensor, a gyroscope, an accelerometer, a magnetic sensor, and a pressure sensor.

20. The system of claim 15, wherein the request is received by the main application processor in response to accessing one or more location-based services through a mobile device, wherein the location-based services include one or more of a map application or an internet search application.

* * * * *